United States Patent [19]

Phaal

[11] Patent Number: 4,591,364
[45] Date of Patent: * May 27, 1986

[54] ABRASIVE MATERIALS

[76] Inventor: Cornelius Phaal, 14 Robant Lane, Rivoniz, Sandton, Transvaal, South Africa

[*] Notice: The portion of the term of this patent subsequent to Jan. 20, 1998 has been disclaimed.

[21] Appl. No.: 184,258

[22] Filed: Sep. 5, 1980

Related U.S. Application Data

[63] Continuation of Ser. No. 941,575, Sep. 12, 1978, Pat. No. 4,246,006.

[30] Foreign Application Priority Data

| Sep. 12, 1977 | [ZA] | South Africa | 77/5458 |
| Dec. 12, 1977 | [ZA] | South Africa | 77/7154 |
| Dec. 12, 1977 | [ZA] | South Africa | 77/7156 |

[51] Int. Cl.$^4$ ................................ B24D 3/06
[52] U.S. Cl. ........................ 51/309; 51/295; 51/307
[58] Field of Search ............... 51/295, 298, 309, 307

[56] References Cited

U.S. PATENT DOCUMENTS

| 2,216,728 | 10/1940 | Benner et al. | 51/309 |
| 3,902,873 | 9/1975 | Hughes | 51/295 |
| 3,929,432 | 12/1975 | Caveney | 51/295 |
| 3,955,324 | 5/1976 | Lindstrom | 51/298 |
| 4,024,675 | 5/1977 | Naidich et al. | 51/296 |
| 4,036,937 | 7/1977 | Roy et al. | 51/307 |
| 4,246,006 | 1/1981 | Phaal | 51/309 |

*Primary Examiner*—James Derrington
*Attorney, Agent, or Firm*—Cushman, Darby & Cushman

[57] ABSTRACT

A method of making aggregated diamond abrasive particles comprising forming a mixture of diamond abrasive particles and a powdered metal, heating the mixture to sinter the metal followed by cooling to produce a mass and crushing the mass to obtain the aggregated particles, characterized in that the particles are selected from Types A, B and C, as hereinafter defined, and mixtures thereof:

Particles of Type A have the following characteristics:
1. A Friatest Index of about 70 to 90 for those particles of size 74 to 88 microns.
2. Medium metal content.
3. Predominantly translucent color with the occasional transparent white, grey and yellow particle.
4. Predominantly blocky shape tending towards elongate particles.
5. Predominantly rough and undulating surface.

Particles of Type B have the following characteristics:
1. Weak, having a Friatest Index of about 65 to 88 for those particles of size 74 to 88 microns.
2. A high metal content.
3. Predominantly dark in color.
4. A blocky and irregular shape.
5. Rough with surface irregularities, re-entrant angles and etch pits.

Particles of Type C have the following characteristics:
1. Medium strength, having a Friatest Index in the range about 100 to 121, for those particles of size 74 to 88 microns.
2. Low metal content.
3. Predominantly yellow in color.
4. An angular to blocky shape with sharp edges.
5. A predominantly smooth surface.

The particles so produced are particularly useful in the grinding, particularly dry grinding, of carbides, nitrides and abrasive compacts.

29 Claims, No Drawings

ABRASIVE MATERIALS

This is a continuation of application Ser. No. 941,575 filed Sept. 12, 1978, now U.S. Pat. No. 4,246,006.

This invention relates to abrasive materials and more particularly to aggregated diamond abrasive particles.

U.S. Pat. No. 4,024,675 describes a method of producing aggregated abrasive grains by sintering a mixture of abrasive powders, metal powders such as copper, tin, nickel, cobalt, iron, silver and alloys thereof and an adhesion-active agent such as titanium, zirconium, chromium, vanadium and silicon to produce a porous cake and then crushing the sintered cake to produce the aggregated particles. The abrasive particles used in the method are selected from diamond, cubic boron nitride, boron carbide, silicon carbide, aluminium oxide and mixtures thereof. The aggregated abrasive particles so produced are incorporated in resin bonded grinding wheels which are used for the grinding of steels and hard alloys.

According to this invention, there is provided a method of making aggregated diamond abrasive particles comprising forming a mixture of diamond abrasive particles selected from Types A, B and C, as hereinafter defined, and mixtures thereof and a powdered metal, heating the mixture to sinter the metal followed by cooling to produce a mass and crushing the mass to obtain the aggregated particles.

The diamond abrasive particles which are used in the present invention are of a particular type and form an essential feature of the invention. The three types of diamond abrasive particles which are used in the method of the invention are characterised below.

Particles of Type A have the following characteristics:
1. A Friatest Index of about 70 to 90, preferably 77 to 87, for those particles of size 74 to 88 microns.
2. Medium metal content, i.e. a metal content of about 1,0 to 1,5 percent by weight.
3. Predominantly translucent colour with the occasional transparent white, grey and yellow particle
4. Predominantly blocky shape tending towards elongate particles.
5. Predominantly rough and undulating surface.

These particles are typically diamonds produced by the process described in U.S. Pat. No. 4,036,937, i.e. the particles remaining after the particles of length to width ratio of at least 2:1 and of size in the range 50 to 170 U.S. mesh have been removed from a batch of particles produce by this method.

Particles of type B have the following characteristics:
1. Weak, having a Friatest Index of about 65 to 88, preferably 80 to 88, for those particles of size 74 to 88 microns.
2. A high metal content, i.e. a metal content of greater than 2 percent by weight.
3. Predominantly dark in colour.
4. A blocky and irregular shape.
5. Rough with surface irregularities, re-entrant angles and etch pits.

These particles are typically of the resinoid diamond type.

Particles of type C have the following characterisics:
1. Medium strength, having a Friatest Index in the range about 100 to 121, preferably 111 to 121, for those particles of size 74 to 88 microns.
2. Low metal content, i.e. a metal content of less than 0,8 percent by weight.
3. Predominantly yellow in colour.
4. An angular to blocky shape with sharp edges.
5. A predominantly smooth surface.

These particles are typically diamonds of the metal bond type which have been rejected on the ground of quality or crushed such reject material. The Friatest Index is a measure of the strength or friability of abrasive particles and is obtained by the commercially available Friatest method. In this test, a sample of the abrasive particles of particular particle size is placed in a capsule with a hard steel ball and shaken for a predetermined period of time. The abrasive particles are then removed from the capsule and screened through the next smaller screen size in relation to the smaller of the two screens used for determining the screen size of the original particles. The amount retained on the screen divided by the weight of the original sample gives you a value R. The friability or Friatest Index (F.T.I.) of the particle may then be calculated from the following formula:

$$\text{Friatest Index (F.T.I.)} = \frac{t}{\log_e(100/R)}$$

where t is the time of shaking in the capsule. The higher the F.T.I. the stronger or less friable the particle.

The diamond abrasive particles which are used as starting material in the manufacture of the aggregated particles may be of the Type A, of the Type B, of the Type C or mixtures thereof. For best results, as discussed more fully hereinbelow, it is preferred that a mixture of particles is used with Type A constituting at least 40 percent of the mixture, preferably 40 to 80 percent of the mixture, Types B and C constituting the balance of the mixture. Types B and C are typically and preferably provided in substantially equal proportions. A typical mixture is one containing 50 percent Type A and 25 percent of each of Types B and C. All percentages in these mixtures are percentages by weight.

A particular size of diamond abrasive particle may be used or a blend of sizes may be used. It is preferable that the particles used are all fine and in particular have a size smaller than about 125 microns.

As is illustrated more fully hereinafter, surprisingly good grinding results are obtained if the aggregated particles are within particular size ranges. It is preferred that the aggregated particles have a size in the range 149 to 250 microns, more preferably in the range 177 to 250 microns.

The binder metal may be any of a variety of metals or alloys. Examples of suitable metals are silver, copper, tin, nickel, cobalt and iron and alloys containing one or more such metals. The metal or alloy will preferably have a melting point below 1200° C. and preferably below 1000° C. Particularly suitable alloys are copper-silver and copper-tin alloys, and more particularly such alloys which are eutectic alloys. A 71:29:: copper:silver alloy is a eutectic alloy and a 80:20:: copper:tin alloy is a eutectic alloy. Where an alloy is employed, the alloy, in powdered form, may be used for the starting mixture. It is, however, preferred that the individual components for the alloy, in powdered form, are used for the mixture. The alloy in this case is produced in situ during sintering.

The size of the metal powder which is used is not critical. The powder will generally be fine, typically having a particle size of less than 100 microns.

The mixture of diamond abrasive particles and metal powder will usually contain a diamond-wetting agent such as titanium, zirconium, vanadium, chromium and silicon. The diamond-wetting agent is typically provided in an amount of 5 to 15 percent by weight of the metal powders.

The amount of metal powder used in the mixture will generally be such as to produce aggregated particles which contain 40 to 60, typically 55, percent by weight of metal.

The powdered mixture of diamond abrasive particles and metal is sintered and then cooled to produce a mass which is coherent and bonded. The sintering typically takes place at a temperature in the range 700° to 1200° C., preferably 900° to 950° C. The period of sintering will vary according to the nature of the metal component in the mixture, but is typically 10 to 20 minutes.

In order to minimise graphitisation of the diamond, the sintering and cooling is preferably carried out in a substantially non-oxidising atmosphere. The non-oxidising atmosphere may be a non-oxidising gas such as hydrogen, nitrogen or an inert gas such as argon or neon or the non-oxidising atmosphere may be provided by a vacuum which is typically $10^{-4}$ Torr or better.

The sintering and cooling may take place with or without compaction of the mixture. Where there is no compaction, that is the powders are in a substantially loose bulk state, a more porous mass is obtained. Compaction, when used, should not be too severe so as to avoid producing too compact a mass.

The crushing of the particles is preferably by shear, rather than impact crushing. Any shear crushing method known in the art may be used. For example, the sintered mass may be crushed to the desired particle size in a jaw or gyro crusher.

The aggregated diamond abrasive particles produced by the above described method consist of a number of diamond abrasive particles held together by the metal. They may be used in abrasive tools, particularly resin-bonded abrasive tools such as grinding wheels. Prior to incorporation in the wheel the aggregated particles may be provided with a thin metal coat.

The abrasive tools incorporating the aggregated diamond abrasive particles may be of conventional construction. In the case of resin-bonded grinding wheels the abrasive particles will generally be present in the grinding portion of the wheel in an amount of 15 to 30, typically 20, percent by volume of that portion. The resin may be any suitable thermosetting resin known in the art of resin-bonded grinding wheels such as a phenolformaldehyde, polyamide, polyimide, urea-formaldehyde, polyester or melamine-formaldehyde resin. The construction of the wheel may be of the flaring cup configuration or of the peripheral configuration. As is known, grinding wheels consist of a central hub portion to which is bonded a peripheral grinding portion. The aggregated diamond abrasive particles when incorporated in resin-bonded abrasive tools have been found to be particularly effective in abrading, particularly under dry conditions, hard materials such as cemented carbides, nitrides and abrasive compacts. The invention thus provides, according to another aspect, a method of abrading a workpiece of the type described above including the steps of providing an abrasive tool, the abrading surface of which comprises aggregated diamond abrasive particles, as produced above, incorporated in a resin matrix, abrading the workpiece by moving the abrading surface of the tool relative to a surface of the workpiece and contacting the relatively moving surfaces. Generally, the abrasive tool will be a grinding wheel which will be rotated and the rotating grinding wheel contacted with the workpiece to effect grinding.

In particular, effective grinding of cemented carbides, particularly tungsten carbide, is achieved in the manner described above. Cemented carbides, as is known in the art, consist of a mass of carbide particles such as tungsten carbide, tantalum carbide or titanium carbide particles bonded into a hard, coherent mass with a metal bonding matrix. The metal is generally cobalt, nickel or iron or an alloy thereof and is generally present in the cemented carbide in an amount of 6 to 35 percent by weight.

Abrasive compacts are well known in the art and consist essentially of a mass of abrasive particles, generally present in an amount of at least 70%, preferably 80 to 90%, by volume of the compact, bonded into a hard conglomerate. Compacts are polycrystalline masses and can replace single large crystals. The abrasive particles of compacts are invariably super-hard abrasives such as diamond and cubic boron nitride.

The invention is further illustrated by the following non-limiting examples.

EXAMPLE 1

Particles of type A were mixed with a commercially available copper/silver eutectic alloy and titanium in powder form. The mixture was made up of 100 parts by weight diamond, 90 parts by weight of the silver/copper alloy and 7 parts by weight titanium. The mixture was heated to a temperature of about 900° C. and then cooled. The heating and cooling took place in a vacuum of $10^{-4}$ Torr and produced a fused mass. The mass was crushed in a jaw crusher to produce aggregated diamond abrasive particles of size in the range 177 to 250 microns.

The aggregated diamond abrasive particles were incorporated into a phenolformaldehyde resin bonded grinding wheel containing 20 percent by volume of the abrasive particles. The grinding wheel was of the flaring cup, i.e. 11V9 configuration and had a 100 mm diameter and a 3 mm thickness. The grinding wheel was made in the conventional manner by molding to a stop. The grinding wheel was used to dry grind a K21 tungsten carbide workpiece at a peripheral speed of 17 meters/sec., an infeed of 0,03 mm and a table traverse speed of 3 meters/min. The G-ratio obtained was 158.

By way of comparison, aggregated diamond abrasive particles were produced using the same method except that commercially available RD diamond particles were used. The aggregated particles were incorporated in a similar 11V9 grinding wheel and the wheel was used to dry grind a K21 carbide workpiece under similar conditions. The G-ratio obtained with this wheel was only 117.

The G-ratio is the ratio of the amount of workpiece removed to the amount of wheel consumed during grinding. The higher the G-ratio the better the wheel.

EXAMPLE 2

Further batches of aggregated diamond particles were produced in a similar manner to Example 1, save that in each case separate copper and silver powders were used in the starting mixture. The aggregated particles produced were incorporated into grinding wheels. The grinding wheels were used to grind tungsten carbide and compared with similar wheels incorporating a commercially available copper-clad diamond grit (which is sold specifically for the dry grinding of carbides). The results of these tests are set out in Tables I and II. The following should be noted in relation to these tests:

The concentration of particles is represented as 75 concentration. This is equivalent to a concentration of 20 percent by volume.

It is apparent from the G-ratios obtained, that wheels incorporating aggregated diamond abrasive particles produced by the method of the invention are superior to wheels incorporating commercially available copper clad grit.

EXAMPLE 3

A number of other tests were carried out to compare aggregated particles using the prescribed particles with aggregated particles using other diamond particles; to evaluate the effect of the amount of metal present in the aggregated particles and to evaluate various sizes of aggregated particles. The procedures followed were similar to those set out in Examples 1 and 2. The results obtained are set out below.

(i) Variations in Diamond Particle

Diamond particles of various types were used as starting material and the G-ratios obtained for the various tests are set out below:

| Diamond Type | Dry Grinding - K21 | Wet Grinding - K3H |
| --- | --- | --- |
| MD | 18 | 40 |
| DXDA-II (an MD particle) | 30 | 53 |
| Type C | 42 | 73 |
| Type A | 62 | 104 |
| Type B | 35 | 65 |

(ii) Variations in Metal Content

The metal content of the aggregated particles was varied. In each case a mixture consisting of 50 percent by weight Type A and 25 percent by weight of each of Types B and C was used in the starting mixture. The results obtained are set out below:

| Percentage Metal in Aggregate | G-Ratio |
| --- | --- |
| 40 | 44 |
| 50 | 50 |
| 60 | 48 |

(iii) Variations in Size of Aggregated Particles

The aggregated particles were crushed to various sizes and then the G-ratios obtained using these various sizes compared. Again, a mixture as specified in (ii) above was used in the starting mixture.

The G-ratios obtained are set out below:

| Size | G-ratio as Percentage of Size 1 |
| --- | --- |
| 1. 177–250 microns | 100 |
| 2. 149–177 microns | 94 |
| 3. 125–149 microns | 77 |
| 4. 105–125 microns | 58 |
| 5. 88–105 microns | 60 |

EXAMPLE 4

A powdered mixture as in Example 1, save that a mixture of silver and copper powders was used, was placed in a mold and compacted under a load of 24 gm/cm$^2$. The resulting compacted mass was sintered and cooled as in example 1. The coherent mass produced was found to have a 58.1 percent porosity.

Using the same starting mixture and same procedure, save that there was no compaction of the mixture, a second coherent mass was produced. This mass was found to have a 61,5 percent porosity.

The two masses were crushed as in Example 1 to produce two batches of aggregated diamond abrasive particles. The two batches were incorporated in different phenolformaldehyde resin bonded grinding wheels and the wheels tested in the dry grinding of tungsten carbide. The two wheels showed no material difference in grinding performance.

TABLE I

| MACHINE | TYPE | TACHELLA | | | |
| --- | --- | --- | --- | --- | --- |
| | TABLE TRAVERSE | 2,0 m/min. | | | |
| | CROSSFEED INFEED | 0,03 mm. | | | |
| | SPINDLE SPEED | 3,200 | | | |
| | TOTAL INFEED | 1,8 mm. | | | |
| COOLANT | TYPE AND DILUTION FLOW RATE | DRY | | | |
| WORKPIECE | MATERIAL | K21 | | | |
| | SIZE | tungsten carbide ¼" × ¼" | | 24 PIECES | |
| WHEEL | SIZE AND TYPE | 100 × 3 mm | | 11V9 | |
| | PERIPHERAL SPEED | 17 m/sec. | | | |
| | BOND NUMBER | 1 | 2 | 3 | 4 |
| GRIT | TYPE | B | | Copper-clad | |
| | SIZE(MICRONS) | 177–250 | | 177–250 | |
| | CONCENTRATION | 75 | | 75 | |
| | POWER | 1120 | 1080 | 1080 | 1240 |
| | | 1080 | 1040 | 1120 | 1040 |
| | | 1040 | 1040 | 1120 | 1040 |
| | Average Power per Wheel | 1060 | 1040 | 1120 | 1040 |
| RESULTS | AVERAGE POWER PER GRIT | 1050 | | 1080 | |
| | G RATIO | 87 | 127 | 56 | 78 |
| | | 83 | 93 | 58 | 53 |
| | | 90 | 67 | 49 | 62 |
| | Average G Ratio for Wheel | 87 | 80 | 54 | 57 |
| | AVERAGE G RATIO FOR GRIT | 84 | | 56 | |

TABLE II

| MACHINE | TYPE | KELLENBERGER |
| --- | --- | --- |
| | TABLE TRAVERSE | 2,0 m/min |
| | CROSSFEED INFEED | 0,02 mm. |

TABLE II-continued

| | | | | |
|---|---|---|---|---|
| | SPINDLE SPEED | 3200 | | |
| | TOTAL INFEED | 1,6 mm. | | |
| COOLANT | TYPE AND DILUTION FLOW RATE | DRY | | |
| WORKPIECE | MATERIAL | K21 | | |
| | SIZE | ¼" × ¼" | | 24 PIECES |
| WHEEL | SIZE AND TYPE | 100 × 3 mm. | | 11V9 |
| | PERIPHERAL SPEED | 17 m/sec. | | |
| | BOND NUMBER | 5 | 6 | 7 |
| GRIT | TYPE | A | B | Copper-clad grit |
| | SIZE (MICRONS) | 177/250 | 177/250 | 177/250 |
| | CONCENTRATION | 75 | 75 | 75 |
| | POWER | 1160 | 1120 | 1280 |
| | | 1120 | 1000 | 1080 |
| | | 1160 | 800 | 1160 |
| | Average Power per Wheel | 1140 | | |
| RESULTS | AVERAGE POWER PER GRIT | 1140 | 947 | 1093 |
| | G RATIO | 63 | 37 | 28 |
| | | 67 | 47 | 27 |
| | | 57 | 43 | 34 |
| | Average G Ratio for Wheel | 62 | 58 49 | 33 |
| | AVERAGE G RATIO FOR GRIT | 62 | 49 | 33 |

I claim:

1. Aggregate diamond abrasive particles produced by the method comprising forming a mixture of diamond abrasive particles and a powdered metal, heating the mixture to sinter the metal followed by cooling to produce a mass and crushing the mass to obtain the aggregated particles, characterised in that the particles are selected from Types A, B and C, as hereinafter defined, and mixtures thereof:

Particles of Type A have the following characteristics:
1. A Friatest Index of about 70 to 90, for particles of size 74 to 88 microns;
b 2. A metal content of about 1.0 to 1.5 percent by weight;
3. Predominantly translucent colour with the occasional transparent white, grey and yellow particle;
4. Predominantly blocky shape tending towards elongate particles;
5. Predominantly rough and undulating surface;

Particles of Type B have the following characteristics:
1. Weak, having a Friatest Index of about 65 to 88, for particles of size 74 to 88 microns;
2. A metal content of greater than 2 percent by weight;
3. Predominantly dark in colour;
4. A blocky and irregular shape;
5. Rough with surface irregularities, re-entrant angles and etch pits;

Particles of Type C have the following characteristics:
1. Medium strength, having a Friatest Index in the range about 100 to 121 for particles of size 74 to 88 microns;
2. A metal content of less than 0.8 percent by weight;
3. Predominantly yellow in colour;
4. An angular to blocky shape with sharp edges;
5. A predominantly smooth surface.

2. Aggregated particles according to claim 1 characterised in that the particles are a mixture of type A particles and particles of at least one type selected from the group consisting of type B and C, type A particles constituting at least 40 percent by weight of the mixture.

3. Aggregated particles according to claim 2 wherein the particles of type A constitute 40–80 percent by weight of the mixture.

4. Aggregated particles according to claim 2 wherein the mixture contains particles of type A, type B and type C, the particles of types B and C being present in substantially equal proportions.

5. Aggregated particles according to claim 1 wherein the particles are a mixture consisting of 50 percent type A particles, and 25 percent of each of types B and C, all percentages being by weight.

6. Aggregated particles according to claim 1 wherein the diamond abrasive particles which are used in the starting mixture have a size smaller than about 125 microns.

7. Aggregated particles according to claim 1 wherein the aggregated particles have a size in the range 149–150 microns.

8. Aggregated particles according to claim 4 wherein the aggregated particles have a size in the range of 149–250 microns.

9. Aggregated particles according to claim 1 wherein the aggregated particles have a size in the range 177–250 microns.

10. Aggregated particles according to claim 4 wherein the aggregated particles have a size in the range of 177–250 microns.

11. Aggregated particles acccording to claim 1 wherein the metal is selected from silver, copper, tin, nickel, cobalt and iron and alloys containing one or more of these metals.

12. Aggregated particles according to claim 11 wherein the metal or alloy has a melting point below 1200° C.

13. Aggregated particles according to claim 11 wherein the metal or alloy has a melting point below 1000° C.

14. Aggregated particles accoring to claim 1 wherein the metal powder consists of a powdered copper/silver alloy.

15. Aggregated particles according to claim 8 wherein the metal powder consists of a powdered copper/silver alloy.

16. Aggregated particles according to claim 1 wherein the powdered metal consists of a mixture of copper and silver powders.

17. Aggregated particles according to claim 8 wherein the powdered metal consists of a mixture of copper and silver powders.

18. Aggregated particles according to claim 1 wherein the mixture of diamond abrasive particles and metal powder also contains a diamond wetting agent.

19. Aggregated particles according to claim 8 wherein the mixture of diamond abrasive particles and metal powder also contains a diamond wetting agent.

20. Aggregated particles according to claim 18 wherein the diamond wetting agent is selected from titanium, zirconium, vanadium, chromium and silicon.

21. Aggregated particles according to claim 18 wherein the diamond wetting agent is present in an amount of 5–15 percent by weight of the metal powders.

22. Aggregated particles according to claim 1 wherein the amount of metal powder in the starting mixture is such as to produce aggregated particles containing 40–60 percent by weight of metal.

23. Aggregated particles according to claim 1 wherein the amount of metal powder used in the starting mixture is such as to produce aggregated particles containing 55 percent by weight of metal.

24. Aggregated particles according to claim 1 wherein sintering takes place at a temperature in the range of 700° to 1200° C.

25. Aggregated particles according to claim 24 wherein the sintering takes place at a temperature in the range 900° to 950° C.

26. Aggregated particles according to claim 1 wherein sintering takes place for a period of 10 to 20 minutes.

27. Aggregated particles according to claim 1 wherein the sintering and cooling takes place in a substantially non-oxidising atmosphere.

28. Aggregated particles according to claim 27 wherein the non-oxidising atmosphere is selected from a non-oxidising gas and a vacuum of $10^{-4}$ Torr or better.

29. Aggregated particles according to claim 1 wherein the crushing is effected by shear crushing.

* * * * *